Dec. 12, 1961 S. R. MEADOWS ET AL 3,013,231

TELEVISION TUNER

Filed Dec. 30, 1955 5 Sheets-Sheet 1

INVENTORS
STANLEY R. MEADOWS and
ALARICO A. VALDETTARO
BY
Mason, Kolehmainen, Rathburn and Wyss
ATTORNEYS

TELEVISION TUNER

Filed Dec. 30, 1955 5 Sheets-Sheet 2

INVENTORS
STANLEY R. MEADOWS and
ALARICO A. VALDETTARO
BY
Mason, Kolehmainen,
Rathburn and Wyss
ATTORNEYS

TELEVISION TUNER

INVENTORS
STANLEY R. MEADOWS and
ALARICO A. VALDETTARO
BY
Mason, Kolehmainen, Rathburn and Wyss
ATTORNEYS

TELEVISION TUNER

Filed Dec. 30, 1955 5 Sheets-Sheet 4

INVENTORS
STANLEY R. MEADOWS AND
ALARICO A. VALDETTARO

BY

Mason, Kolehmainen, Rathburn and Wyss
ATTORNEYS

TELEVISION TUNER

Filed Dec. 30, 1955 5 Sheets-Sheet 5

INVENTORS
STANLEY R. MEADOWS and
ALARICO A. VALDETTARO
BY
Mason, Kolehmainen, Rathburn and Wyss
ATTORNEYS

3,013,231
TELEVISION TUNER

Stanley R. Meadows and Alarico A. Valdettaro, Bloomington, Ind., assignors to Sarkes Tarzian, Inc., Bloomington, Ind., a corporation of Indiana Filed Dec. 30, 1955, Ser. No. 556,648
12 Claims. (Cl. 334—58)

The present invention relates to television tuners, and, more particularly, to television tuners of the type which employ a rotary selector switch having a plurality of station selecting positions one for each television station to be received.

In present day television tuners of the rotary switch type a plurality of switch wafers are actuated in unison by means of a common station selector shaft which extends through appropriately shaped openings in the rotor portion of each switch wafer and an indexing plate is employed, which is mounted on the front wall of the tuner, to provide a detent action for the station selector shaft in each one of the station selecting positions of the tuner. While this indexing arrangement is sufficiently accurate to restrain the station selector shaft in predetermined station selecting positions corresponding to suitable indicia on the front panel of the television receiver, the rotors of the individual switch wafer sections are not accurately positioned due to the relatively large clearance holes provided for the shaft in the rotor of each switch wafer. Accordingly, even though the shaft is held in a predetermined position by the detent action of the indexing arrangement, the position of the individual switch rotors with respect to their respective stators may vary considerably. This effect is particularly serious in the case of the switch wafer which is used to control the frequency of the local oscillator portion of the tuner since the position of the rotor directly affects the frequency of the local oscillator and if this rotor position varies the local oscillator cannot be reset to the same frequency each time the station selector switch is adjusted to receive a particular television station. This reset error is particularly noticeable when receiving the higher frequency television stations at which frequencies the rotor switch contact has appreciable inductance and hence directly affects the oscillator tuning elements which are connected to individual stator contacts of the oscillator switch wafer.

It is, therefore, an object of the present invention to provide a new and improved television tuner of the rotary switch type wherein the switch rotor may be accurately positioned with respect to the switch stator for each station selecting position of the switch.

It is another object of the present invention to provide a new and improved television tuner of the rotary switch type wherein the local oscillator switch wafer may be accurately adjusted to predetermined positions corresponding to the television stations to be received and wherein the switch rotor may be accurately reset to these predetermined positions throughout substantially the entire useful life of the rotary switch.

It is a further object of the present invention to provide a new and improved television tuner of the rotary switch type wherein cooperating indexing means are provided on the rotor and stator of the local oscillator wafer portion of the station selector switch so that the switch rotor is accurately positioned with respect to the stator in each station selecting position of the switch while providing a detent action for the station selector shaft of the switch in each of said station selecting positions.

In present day television tuners it is customary to provide a vernier tuning capacitor which is adjustable independently of the station selector switch of the tuner and is employed to provide precise tuning of the local oscillator to each individual television station. This vernier tuning capacitor is preferably positioned within a shielded compartment of the tuner to prevent radiation from this element of the tuner which may be picked up by other receivers in the vicinity. However, the provision of an indexing mechanism for the station selector shaft on the front wall of the tuner requires a relatively complicated mechanical drive connection between the vernier tuning shaft, which usually surrounds the station selector shaft of the tuner, and the variable tuning capacitor within the shielded tuner compartment, due to the fact that the indexing plate prevents the vernier tuning shaft from extending directly through the front wall of the tuner.

It is, therefore, another object of the present invention to provide a new and improved television tuner wherein the vernier tuning shaft extends through the front wall of the tuner and is directly connected to the variable tuning capacitor of the tuner while providing an arrangement wherein indexing of the station selector shaft of the tuner is provided in each station selecting position thereof.

It is a further object of the present invention to provide a new and improved television tuner wherein accurate indexing of individual switch wafers is provided for each station selecting position of the station selector switch while permitting the vernier tuning shaft of the tuner to be directly connected to the vernier tuning capacitor thereof.

Due to the fact that the station selector shaft and the vernier tuning shaft of a conventional tuner are positioned in coaxial relation and have substantial frictional engagement between the adjacent surfaces thereof, a considerable drag is exerted on the vernier tuning shaft when the station selector knob of the tuner is rotated to select different television stations. In many cases this frictional drag causes the vernier tuning capacitor to be thrown out of adjustment and necessitates readjustment of the vernier tuning knob after the desired television station has been selected. It would be desirable to provide a detent action for the vernier tuning shaft of the tuner so that this shaft may be held against the above-described frictional drag in any one of a plurality of vernier tuning positions. However, the use of the above-described indexing plate arrangement in conventional tuners does not lend itself to the addition of a detent action for the vernier tuning shaft since the conventional indexing plate arrangement is usually positioned on the front wall of the tuner.

Accordingly, it is another object of the present invention to provide a new and improved television tuner wherein a detent action is provided for the vernier tuning shaft of the tuner in any one of a plurality of vernier tuning positions so that the vernier tuning shaft is prevented from moving during manipulation of the station selector shaft of the tuner.

It is a further object of the present invention to provide a new and improved television tuner wherein a detent action is provided for both the vernier tuning shaft and the station selector shaft of the tuner to prevent interaction between these shafts during selection of a television station.

It is a still further object of the present invention to provide a new and improved television tuner wherein a detent action is provided for both the vernier tuning shaft and the station selector shaft of the tuner by means of indexing means positioned entirely within the shielded portion of the tuner and arranged so that the vernier tuning shaft may be directly connected to the vernier tuning capacitor within this shielded compartment.

It is another object of the present invention to provide a new and improved rotary switch, suitable for use in television tuners, wherein a self-indexing switch wafer is provided to permit accurate resetting of the switch rotor in each switch position thereof.

In the manufacture of television tuners, a further problem arises in that television receivers require station selector shafts and vernier tuning shafts of different dimensions and lengths to fit different styles and models of television cabinets. This requirement has heretofore meant that the tuner manufacturer could not be able to start manufacturing a particular type of tuner until he received an order from the television receiver manufacturer specifying the length of shafts required for the particular model receiver in which the tuner is to be used. As a result, the tuner manufacturer could not stock up on tuners before he received shaft specifications and hence could not give as fast delivery once the order is placed.

It is, therefore, another object of the present invention to provide a new and improved television tuner which may be stocked in large quantities as a standard item and wherein a station selector shaft and vernier tuning shaft assembly of the required specifications may be readily connected to the stock tuner to provide a complete tuner unit on relatively short notice.

The invention, both as to its organization and method of operation, together with further objects and advantages thereof, will best be understood by reference to the following specification taken in connection with the accompanying drawings, in which.

Figure 1:
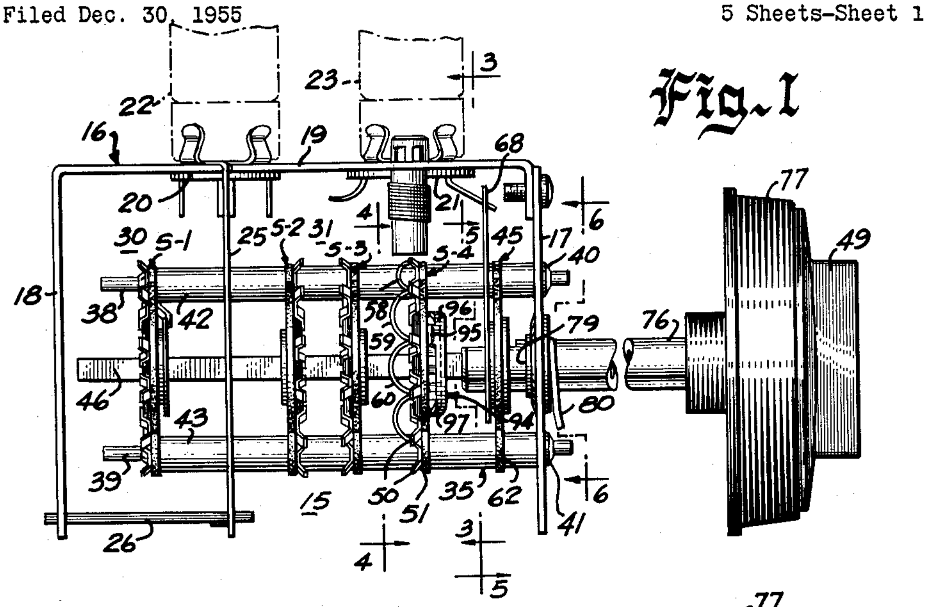
FIG. 1 is a side elevational view of a television tuner embodying certain features of the present invention.
Figure 2:
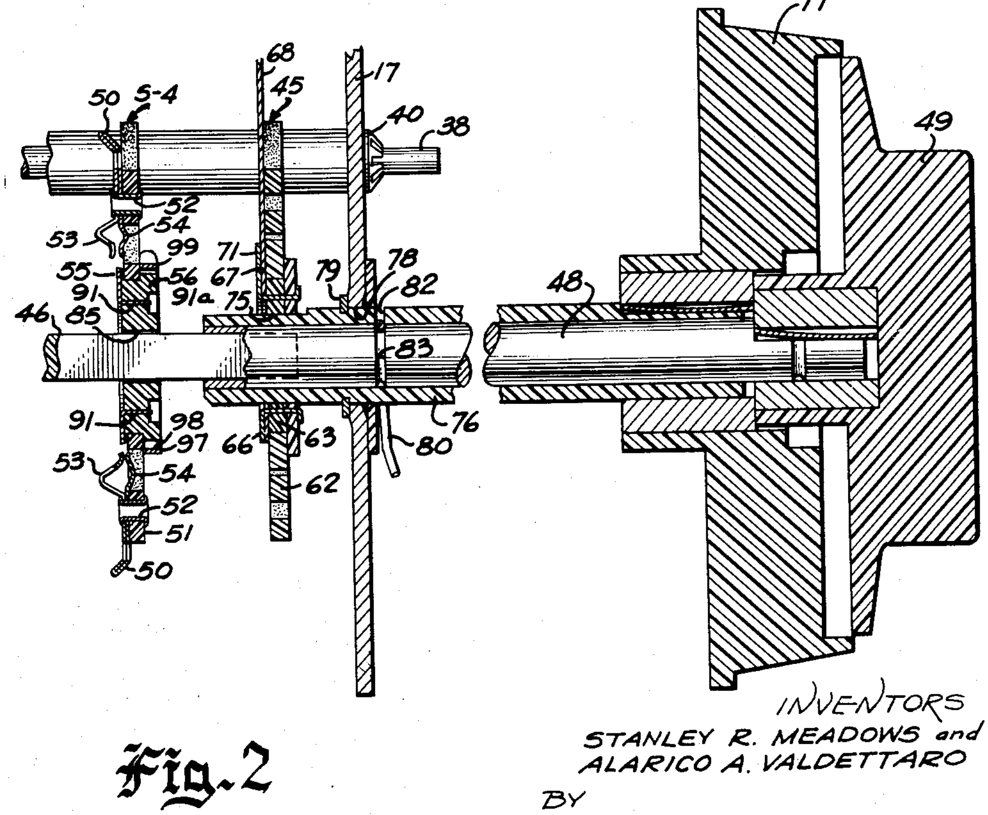
FIG. 2 is a fragmentary portion of the front end of the tuner of FIG. 1 taken on a somewhat larger scale.
Figure 3:
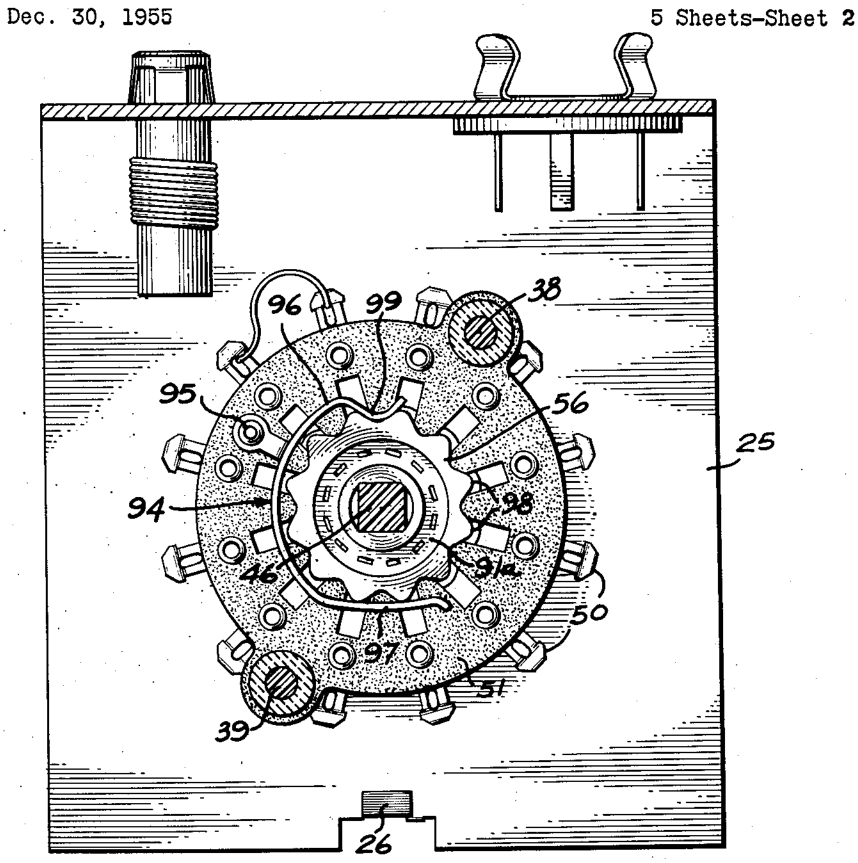
FIG. 3 is a sectional view taken along the lines 3—3 of FIG. 1.
Figure 4:
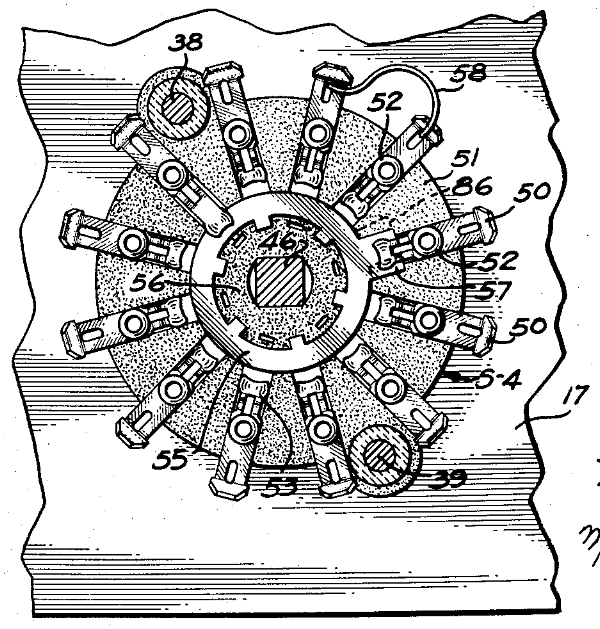
FIG. 4 is a sectional view taken along the lines 4—4 of FIG. 1.
Figure 5:
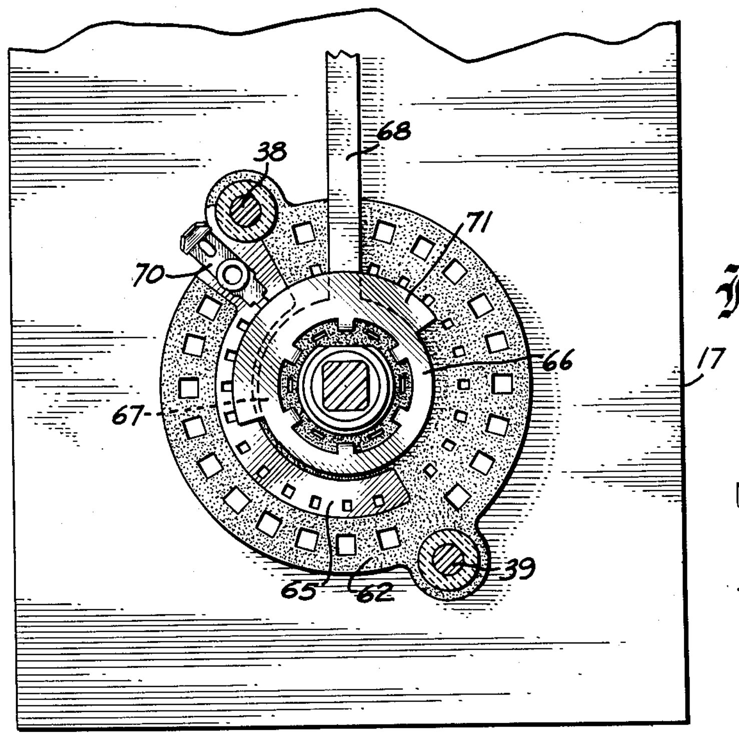
FIG. 5 is a sectional view taken along the lines 5—5 of FIG. 1.
Figure 7A:
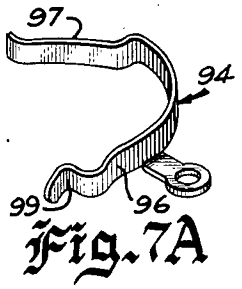
FIG. 7A is a perspective view of the stator indexing member used in the tuner of FIG. 1.
Figure 7:
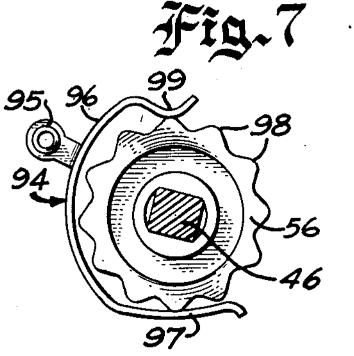
FIG. 7 is a fragmentary side elevational view of the wafer indexing mechanism employed in the tuner of FIG. 1.
Figure 6:
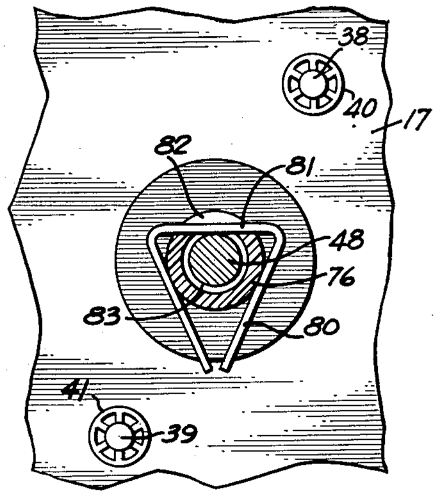
FIG. 6 is a sectional view taken along the lines 6—6 of FIG. 1.

Referring now to the drawings, and more particularly to FIGS. 1 to 7, inclusive, thereof, the present invention is therein illustrated as comprising a television tuner, indicated generally at 15, which is provided with a generally U-shaped chassis 16 having front and rear walls 17 and 18 and a top deck portion 19 on which are mounted the tube sockets 20 and 21 for the two tubes 22 and 23 of the tuner. Preferably the tube 22 is a pentode type tube and acts as the radio frequency amplifier of the tuner, the tube 23 being preferably of the double triode type and functioning as both the mixer and local oscillator of the tuner. A metallic partition 25 is secured to the chassis deck 19 and to the rear wall 18 by means of the tie bar 26 and separates the chassis into a rear RF tuning compartment 30 and a forward mixer-oscillator tuning compartment 31. A sheet metal cover (not shown) is wrapped around the exposed sides and bottom of the chassis 16 so as to provide completely enclosed and shielded tuning compartments 30 and 31.

The partition 25 supports the rear end of a rotary station selector switch indicated generally at 35, the forward end of the switch 35 being supported on the front wall 17 of the chassis 16. The selector switch 35 comprises a plurality of switch wafers S–1, S–2, S–3 and S–4 which are supported on the side rods 38 and 39 which extend through the partition 25 and are secured to the front wall 17 by means of the speed nuts 40 and 41, the desired separation between the wafers S–1, S–2, etc., being provided by suitable ceramic spacers, such as the spacers 42 and 43. A vernier tuning wafer 45 is also mounted on the side rods 38, 39 between the switch wafer S–4 and the front wall 17 of the tuner. Each of the switch wafers S–1, S–2, etc., and the vernier tuning condenser 45 includes a stator portion which is secured to the side rods 38 and 39 and is provided with a central opening within which is positioned the switch rotor, all of the rotors of the switch wafers being controlled from a main selector shaft 46 which extends transversely through openings of a configuration corresponding to the cross section of the main selector shaft 46 in each switch rotor. In the illustrated embodiment the shaft 46 is of insulating material and of square cross section, a metal extension shaft 48 being secured to the forward end of the tuning shaft 46 and carrying a station selector knob 49 on the outer end thereof.

Each of the switch wafers, such as the switch wafer S–4 (FIG. 4), is provided with a plurality of spaced stator contacts 50, which are secured to the stator plate 51 of the switch wafer by means of the eyelets 52, each of the stator contacts comprising a pair of opposed contact fingers 53 and 54 (FIG. 2) which are adapted to receive therebetween the edge portion of a rotor blade contact 55 which is secured to the rotor 56 of the switch wafer by means of the prongs 91 which extend through the rotor 56 and are staked or otherwise secured in the groove 91*a* (FIG. 2) of the switch rotor 56. Accordingly, as the tuning shaft 46 is rotated to successive station selecting positions a projecting portion 57 of the rotor blade 55 engages successive ones of the stator contacts 50 so as successively to connect oscillator tuning elements to the local oscillator of the tuner. These tuning elements may comprise any suitable inductance coils such as the loops of wires 58, 59, 60, etc. (FIG. 1), which are connected between individual ones of the stator contacts 50 so as to provide the desired tuning combination to receive a particular television station. In this connection will be understood that suitable tuning elements are connected to each active stator contact of each of the switch wafers S–1, S–2, S–3 and S–4, as shown, for example, in Krepps Patent No. 2,665,377 and as will be described in more detail hereinafter in connection with the electrical circuit diagram of FIG. 10.

The vernier tuning capacitor 45 comprises the stator plate 62 which is supported on the side bars 38 and 39 and is provided with a central opening within which is positioned a rotor plate 63, both of the plates 62 and 63 being of insulating material. A conductive layer 65 (FIG. 5) is formed by any suitable means on the stator plate 62 and acts as the fixed plate of the vernier tuning capacitor. A movable capacitor plate 66 is secured to the rotor 63 and is spaced from the fixed plate 65 by means of a stationary contact member 68 the annular portion 67 of which makes electrical contact with the movable plate 66 as the rotor 63 is moved. A fixed contact member 70 is provided on the stator plate 62 which makes electrical contact with the metallic condenser plate 65. Accordingly, as the rotor 63 is rotated the arcuate section 71 of the movable plate 66 overlies a variable portion of the fixed capacitor plate 65 so as to provide a variable capacity between the contact members 68 and 70.

The rotor 63 is provided with a D-shaped opening 75 which is adapted to receive the flattened end portion of a vernier tuning shaft 76 of insulating material, a vernier tuning knob 77 being secured to the outer end of the vernier tuning shaft 76. The shaft 76 is rotatably mounted in an opening 78 in the end wall 17 of the tuner by a suitable staking operation or the like, and a C-washer 79 prevents the shaft 76 from being pulled out of engagement with the rotor 63. A spring clip 80 of generally U-shaped configuration is positioned with the bight portion 81 thereof extending through a slot 82 in the vernier tuning shaft 76 and is positioned within a groove 83 in the station selector extension shaft 48 so that the station selector shaft 48 is also prevented from being pulled out of the front end of the tuner.

In conventional tuners a detent action is provided for the station selector shaft of the tuner in each station selecting position thereof by employing a suitable indexing plate which is usually positioned on the front wall of the tuner and is connected to the inner station selector shaft of the tuner so that the vernier tuning shaft cannot extend directly through the front wall of the tuner as does the vernier tuning shaft 76 of the present invention. Furthermore, when an indexing plate is employed to position the station selector shaft at the desired station selecting positions the actual position of the individual switch rotors may vary considerably even though the station selector shaft itself is accurately positioned at the desired station selecting position. This will be readily apparent by considering FIG. 2 wherein it will be evident that if the station selector shaft 46 is accurately positioned as predetermined station selecting positions the switch rotor 56 may not be accurately positioned with respect to the cooperating stator plate 51 due to the relatively large clearance hole 85 provided in the switch rotor 56. On the other hand the relatively large clearance hole 85 is required in each switch rotor in order to permit assembly of a plurality of switch wafers on the same side bars and actuation thereof by a common station selector shaft without binding or damage to the switch rotors themselves. The error in positioning the switch rotor is particularly important in the case of the oscillator switch wafer S–4 since the rotor plate 55 is itself a part of the oscillator tuning element and if the position of the rotor blade 55 is not accurately reset to the same position with respect to the individual stator contacts 50 the frequency of the local oscillator of the tuner cannot be set to the required value to receive the desired television station. For example, if the rotor blade 55 is mispositioned by an amount sufficent to cause the contact section 57 thereof to be misaligned as indicated in dotted lines at 86 in FIG. 4, the frequency of the local oscillator will be off by a corresponding amount.

In order to provide a suitable indexing mechanism for the station selector shaft 46 of the tuner of the present invention while permitting the oscillator switch rotor 56 to be accurately reset to the same predetermined position in each station selecting position of the tuner, cooperating indexing means are provided on both the rotor 56 and the stator 51 of the oscillator switch wafer S–4. More particularly, the switch rotor 56 is provided with external teeth 98 and acts as a cam plate in conjunction with an indexing member 94 which is pivotally mounted on the stator plate 51 by means of the rivet 95 and is provided with a pair of resilient arm portions 96 and 97 which engage opposite sides of the rotor 56. Preferably the rotor 56 is of nylon to provide a long life characteristic for the indexing mechanism while being nonmetallic to prevent interference with the oscillator tuning elements. The arm portion 97 is adapted to ride on the outer edges of the teeth 98 provided in the periphery of the rotor 56 and the arm portion 96 is provided with an indexing head portion 99 having a semi-circular contour which is adapted to engage the sides of adjacent ones of the teeth 98 so that the rotor 56 is accurately positioned with respect to the stator plate 51.

It will be noted that the station selector shaft 46 is also restrained by the above described indexing mechanism in the correct station selecting position. However, the position of the shaft 46 may vary considerably without affecting the position of the rotor 56 since this rotor is accurately held at all times in the correct indexing position by means of the teeth on the rotor 56 and the indexing member 94 and may be accurately reset to this position regardless of the play between the shaft 46 and rotor 56. When the station selector shaft 46 is rotated the indexing head 99 is moved outwardly until it passes over the tip of the next tooth 98 at which time the indexing head snaps into position between the next two teeth 98 and holds the rotor 56 accurately in the next station selecting position. It will also be noted that the arm 97 of the indexing member 94 is considerably longer than the arm portion 96 and the member 94 is pivoted at a point which is offset from the axis of symmetry of the member 94. It has been found that if the arms 96 and 97 are made of equal length the indexing mechanism develops unequal detent forces when the rotor 56 is rotated in opposite directions. Thus, if the arms 96 and 97 are of equal length and the rotor 56 is rotated in a clockwise direction as viewed in FIG. 3 the rotor would be harder to turn, i.e., a greater detent force would be exerted, than if the rotor 56 is rotated counterclockwise. However, with the offset pivotal arrangement of the present invention the detent forces are substantially equalized and the station selector knob 49 may be rotated in either direction by exerting the same torque thereon.

The above described switch wafer indexing mechanism has the further advantage that it permits a much simpler construction for the vernier tuning capacitor drive arrangement of the tuner while at the same time providing an arrangement wherein the vernier tuning capacitor is positioned within a shielded compartment of the tuner to prevent oscillator radiation and its attendant pickup problems. Thus, with the cooperating indexing member 94 and teeth 98 on the rotor 56 of the switch wafer S–4, the front wall 17 of the tuner is not required for the conventional indexing plate arrangement but instead may be used as a bearing for the outer vernier tuning shaft 76 so that this shaft can extend directly through the front wall of the tuner 16 and actuate the rotor 63 of the vernier tuning capacitor directly.

Figure 10:
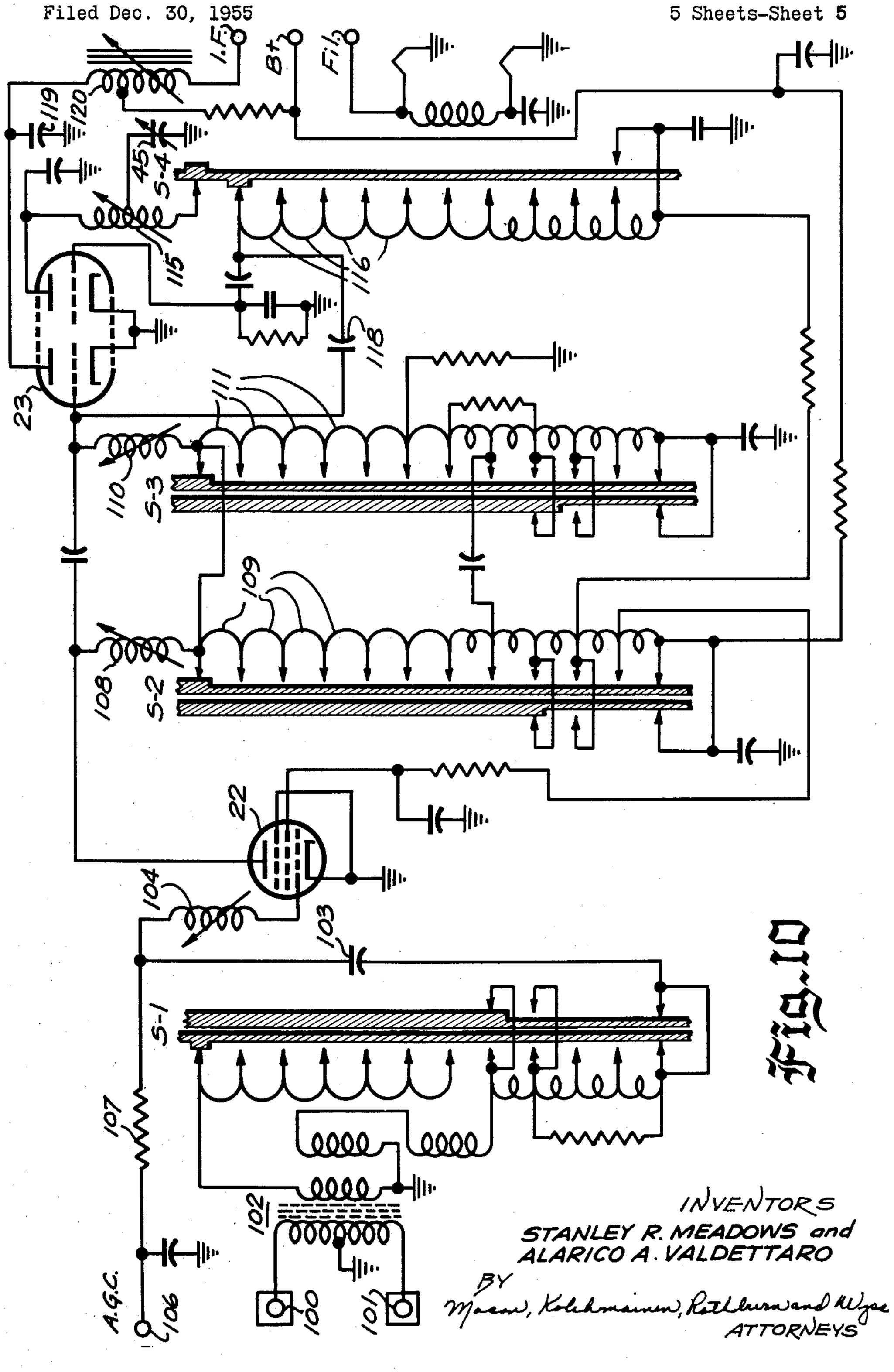
FIG. 10 is an electrical schematic diagram of the circuit components of the tuner of FIG. 1.

In FIG. 10 there is shown the electrical schematic diagram of the circuit components of the tuner of FIG. 1, it being understood that these electrical components have not been shown in FIG. 1 to simplify illustration thereof. In the schematic diagram of FIG. 10 the switch wafers S–1, S–2, S–3 and S–4 of the tuner of FIG. 1 are shown in developed form to simplify the illustration of the circuit connections thereto, each of these switch wafers being shown with the rotor thereof in the channel 13 position, i.e., the highest frequency channel which may be selected by the tuner. The television signals which are received by an antenna system connected to the antenna terminals 100 and 101 are coupled through the antenna input transformer 102, through the switch wafer S–1 and through the coupling condenser 103 and the choke coil 104 to the control grid of the RF amplifier tube 22. An AGC voltage from the second detector portion of the television receiver is impressed upon the AGC terminal 106 and is supplied through the resistor 107 and the choke coil 104 to the control grid of the tube 22. The plate circuit of the tube 22 is tuned by means of the coil 108 and the incremental inductances 109 which may be selectively connected in circuit by means of the switch wafer S–2. The anode of the tube 22 is capacity connected to the control grid of the left-hand section of the mixer-oscillator tube 23, this left-hand section of the tube 23 acting as a mixer the input circuit of which is tuned by means of the coil 110 and the incremental inductances 111 which are selectively connected in circuit by means of the switch wafer S–3. The right hand section of the tube 23 is employed as the local oscillator of the tuner and the plate circuit if this section of the tube 23 includes the variable inductance 115 to which are selectively added the incremental inductances 116 by means of the oscillator switch wafer S-4, the vernier tuning capacitor 45 being connected from a tap on the inductance 115 to ground so as to vary the frequency of the oscillator by one or two megacycles to permit a fine tuning adjustment to the desired television signal. The output of the local oscillator section of the tube 23 is coupled through the condenser 118 to the control grid of the mixer section of the tube 23 and the plate circuit of the left hand section of the tube 23 is tuned by means of the condenser 119 and the coil 120 to the desired intermediate frequency.

Figures 8, 9, 11, 12, 13:
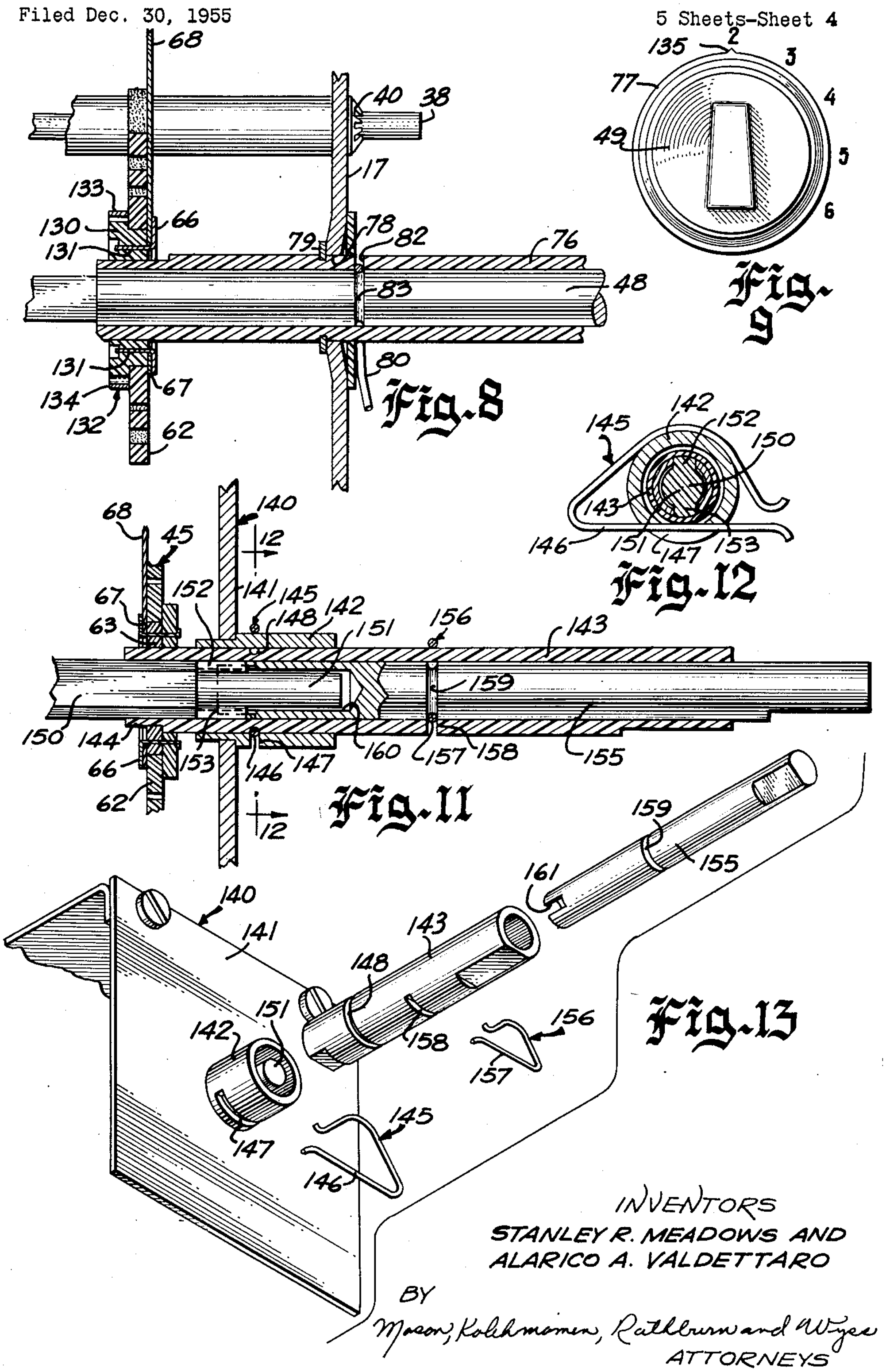
FIG. 8 is a fragmentary side elevational view of an alternative embodiment of the invention wherein a detent action for the vernier tuning shaft of the tuner is provided.
FIG. 9 is a fragmentary front view of a preferred knob and indicia arrangement for the vernier detent embodiment of FIG. 8.
FIG. 11 is a fragmentary sectional view of an alternative embodiment of the present invention showing the shaft assembly which may be readily connected to a tuner of standard design.
FIG. 12 is a sectional view taken along the lines 12—12 of FIG. 11.
FIG. 13 is an exploded view of the shaft assembly of FIG. 11.

In accordance with a further feature of the present invention a detent action may be provided for the vernier tuning shaft 76 to position the vernier tuning capacitor 45 in any one of a plurality of vernier tuning positions without substantially increasing the cost or complexity of the tuner. In many instances the frictional drag between the station selector shaft 48 and the coaxial vernier tuning shaft 76 is sufficiently great to cause the shaft 76 to rotate when the station selector shaft 48 is rotated to select a particular television channel. As a result the fine tuning capacitor 45 is thrown out of adjustment and must be reset by adjustment of the vernier tuning knob 77 after the desired television station has been selected. In accordance with the present invention this condition may be avoided by employing an indexing mechanism on the vernier tuning wafer itself, as shown in FIG. 8, so that the vernier tuning shaft 76 is prevented from rotating when the station selector shaft is rotated to select a particular channel. Thus, in the embodiment of FIG. 8 cooperating indexing means are provided on the rotor and stator of the vernier tuning wafer so as to provide a detent action at a plurality of arbitrarily defined vernier tuning positions as the vernier tuning shaft 76 is rotated. More particularly, the vernier tuning wafer rotor 130, is provided with external teeth and may be of nylon, similar to the rotor 56 and is secured to the movable capacitor plate 66 by means of the tines or deformable locking fingers 131. An indexing member 132 is pivotally mounted on the stator plate 62 and is provided with the opposed arm portions 133 and 134 which engage the opposite sides of the rotor 130 and function to hold the rotor 130 in any one of a plurality of arbitrary vernier tuning positions. With this arrangement the vernier tuning shaft 76 may be rotated by adjustment of the vernier tuning knob 77 against the detent action of the indexing mechanism 130, 132 until the desired fine tuning of the local oscillator is achieved. However, when the station selector shaft 48 is rotated to select a different television channel the vernier tuning shaft is not dragged out of adjustment since the detent action of the indexing mechanism 130, 132 provided on the vernier tuning wafer holds the shaft 76 in its previously adjusted position. If a vernier detent action is provided for the vernier tuning shaft 76, a pointer 135 may be provided on the vernier tuning knob 77, as shown in FIG. 9, and the television channel indicia normally provided on the front panel of the receiver, i.e., the markings "2," "3," "4," etc. may be employed in conjunction with the pointer 135 to indicate the position of the vernier tuning knob 77. Thus, the operator of the receiver may find that the oscillator is tuned best when the pointer 135 is opposite the channel 5 marker and if the vernier tuning knob 77 is not adjusted so that the pointer 135 is opposite the "5" mark he will know that the vernier tuning capacitor needs adjustment. In this connection it will be understood that the vernier tuning knob 77 and the vernier tuning capacitor plate 66 are continuously rotatable even though the above described indexing mechanism is provided on the vernier tuning wafer. It will also be noted that if the rotor 130 is provided with the same number of teeth as the rotor 56 of the switch wafer S-4, the detent positions of the vernier tuning knob 75 will correspond exactly with the station selector positions of the station selector shaft 48 and the channel markers on the front of the television cabinet. However, it will be understood that any other suitable means for indicating the position of the vernier tuning knob may be employed in conjunction with the vernier detent mechanism described above.

Referring to FIGS. 11 to 13, inclusive, of the drawings, there is shown therein an alternative embodiment of the present invention wherein a separate station selector shaft and vernier tuning shaft assembly is provided which may be readily assembled on a tuner of standard design so as to provide a complete tuner unit on relatively short notice. In conventional tuner design the station selector shaft and vernier tuning shaft of the tuner form an integral part of the tuner unit and yet the length of the shafts are different for almost every model of television receiver in which the tuner is used. As a result, the tuner manufacturer is unable to manufacture tuner units ahead of schedule but must wait until he receives specifications from the television receiver manufacturer as to shaft lengths and other dimensions before going into production. The tuner manufacturer thus cannot stock up on tuners before he receives the tuner specifications and cannot give as fast delivery once the order is placed. In accordance with the embodiments shown in FIGS. 11 to 13, inclusive, a tuner 140, of standard design, is provided with a front wall 141 within which is mounted a shaft supporting bushing 142 which is secured to the front panel 141 by any suitable means such as a staking operation or the like. The vernier tuning shaft 143 of the tuner 140 is provided with a flattened end portion 144 which is adapted to engage the rotor 63 of the vernier tuning wafer 45 and is held in place by means of a spring clip 145, the arm 146 of which extends through a slot 147 in the bushing 142 and engages a groove 148 in the vernier tuning shaft 143, it being understood that a suitable vernier tuning knob may be connected to the outer end of the vernier tuning shaft 143. The station selector shaft 150 of the tuner 140, which is of double D cross section, terminates in an end portion 151 of circular cross section and a pair of opposed keys 152 and 153 are formed in the shaft 150 adjacent the portion 151 thereof. A detachable station selector shaft 155 is retained to the vernier tuning shaft 143 by means of a spring clip 156 which is provided with an arm portion 157 which extends through a slot 158 in the vernier tuning shaft 143 and engages a groove 159 in the detachable station selector shaft 155. The inner end of the shaft 155 is provided with a counterbore 160 and has a pair of opposed notches 161 in the hollow end portion thereof thus formed. The notches 161 are adapted to engage the keys 152 and 153 on the station selector shaft 150 when the tuner shaft assembly is in its assembled position.

With the station selector and vernier tuning shaft assembly arrangement described above the vernier tuning shaft 143 and the detachable station selector shaft 155 form a sub-assembly unit which may be detached from the tuner proper by merely removing the spring clip 145. When this is done, the vernier tuning shaft 143 can be removed from engagement with the vernier tuning rotor 63 and the shaft 155 may be removed from engagement with the keyed end portion of the station selector shaft 150. As a result, the tuner 140 may be manufactured in large quantities without the shafts 143 and 155 and may be completely tuned and calibrated. The calibrated tuners 140 may then be stocked for future orders without station selector and vernier tuning shaft assemblies. When a television receiver manufacturer desires a number of tuner units with station selector shafts and vernier tuning shafts of predetermined lengths and other specifications the shaft assembly units may be made up to these desired specifications and may be readily assembled on the stock tuners by merely inserting the vernier tuning shaft 143 into the vernier tuning wafer 63 of the stock tuner and engaging the notches 161 of the shaft 155 with the keys 152 and 153 of the shaft 150 of the stock tuner. Accordingly, complete tuning units may be readily constructed on short notice to any desired manufacturer's shaft requirements. In this connection it will be understood that the vernier tuning wafer 45 and the station selector switch wafers of the tuner 140 are preferably constructed according to one of the embodiments of FIGS. 1 and 8 with the required indexing mechanism on one of the station selector switch wafers so that the shaft assembly unit may be directly connected to the vernier tuning rotor and the station selector shaft through the front wall of the tuner in the manner described above. It will also be noted that with the detachable station selector shaft 155 rotatably assembled to the vernier tuning shaft 143 by means of the spring clip 156 only a single operation is required to connect the shaft assembly to the stock tuner. Thus, by merely inserting the assembly within the bushing 142 in the manner described above and snapping the spring clip 145 into position both the shaft 143 and the shaft 155 are operatively connected to the tuner 140 but may be independently rotated to perform their desired functions of station selection and vernier tuning.

While there have been described what are at present considered to be the preferred embodiments of the invention, it will be understood that various modifications may be made therein which are within the true spirit and scope of the invention as defined in the appended claims.

What is claimed as new and desired to be secured by Letters Patent of the United States is:

1. In a television tuner, a station selector switch including an oscillator switch wafer having a rotor and a stator, said stator having a plurality of spaced stationary contacts thereon and oscillator tuning elements connected to said stationary contacts, a station selector shaft extending through the rotor of said oscillator switch wafer for selectively connecting the same to said stationary stator contacts, cam means on said rotor and an indexing member on said stator and having a pair of opposed spring arms adapted to engage opposite edges of said cam means for accurately positioning said rotor with respect to said stator in each of a plurality of station selecting positions of said shaft and irrespective of any play between said shaft and said oscillator switch rotor, 2. In a television tuner, a station selector switch including an oscillator switch wafer having a rotor and a stator, said stator having a plurality of spaced stationary contacts thereon and oscillator tuning elements connected to said stationary contacts, a station selector shaft extending through the rotor of said oscillator switch wafer for selectively connecting the same to said stationary stator contacts, cam means on said rotor and an indexing member on said stator and having pair of opposed spring arms adapted to engage opposite edges of said cam means for biasing said station selector shaft at predetermined station selecting positions corresponding to said stationary stator contacts and accurately positioning said rotor with respect to said stator in each of said station selecting positions irrespective of any play between said shaft and said oscillator switch rotor.

3. In a television tuner, a station selector switch including an oscillator switch wafer having a rotor and a stator, said stator having a plurality of spaced stationary contacts thereon and inductive oscillator tuning elements connected to said stationary contacts, said rotor having at least one movable contact thereon adapted successively to engage said stator contacts in successive station selecting positions of said rotor, a station selector shaft connected to said rotor for selectively moving said rotor to said station selecting positions, cam means on said rotor and an indexing member on said stator and having a pair of opposed spring arms adapted to engage opposite edges of said cam means to index said rotor in each of a plurality of stator contact engaging positions for providing a detent action for said station selector shaft in each of said station selecting positions while providing accurate resettability of said rotor in each of said station selecting positions irrespective of any play between said shaft and said oscillator switch rotor.

4. In a television tuner, a station selector switch including an oscillator switch wafer having a rotor and a stator, said stator having a plurality of spaced stationary contacts thereon and inductive oscillator tuning elements connected to said stationary contacts, said rotor having at least one movable contact thereon adapted successively to engage said stator contacts in successive station selecting positions of said rotor, an oscillator selectively controllable in frequency by said oscillator tuning elements, the frequency of said oscillator being affected by the relative position of said rotor and stator in each of said station selecting positions, a station selector shaft connected to said rotor for selectively moving said rotor to said station selecting positions to adjust the frequency of said oscillator, cam means on said rotor and an indexing member on said stator and having a pair of opposed spring arms adapted to engage opposite edges of said cam means for providing a detent action for said station selector shaft in each of said station selecting positions while providing accurate resettability of the frequency of said oscillator in each of said station selecting positions irrespective of any play between said shaft and said oscillator switch rotor.

5. In a television tuner, a station selector switch including an oscillator switch wafer having a rotor and a stator, said stator having a plurality of spaced stationary contacts thereon and inductive oscillator tuning elements connected to said stationary contacts, said stationary contacts each including a pair of opposed contact fingers, said rotor having a contact blade thereon adapted successively to engage said pairs to contact fingers in successive station selecting positions of said rotor, a station selector shaft connected to said rotor for selectively moving said rotor to said station selecting positions, an oscillator selectively controllable in frequency by said oscillator tuning elements, the relative positions of said contact blade and said pairs of contact fingers affecting the frequency of said oscillator in each of said station selecting positions, cam means on said rotor and an indexing member on said stator and having a pair of opposed spring arms adapted to engage the opposite edges of said cam means for providing a detent action for said station selector shaft in each of said station selecting positions while accurately resetting said rotor blade with respect to said pairs of stator contact fingers in each of said positions irrespective of any play between said shaft and said oscillator switch rotor.

6. In a television tuner, a station selector switch including an oscillator switch wafer having a rotor and a stator, said stator having a plurality of spaced stationary contacts thereon and inductive oscillator tuning elements connected to said stationary contacts, said stationary contacts each including a pair of opposed contact fingers, said rotor having a contact blade thereon adapted successively to engage said pairs of contact fingers in successive station selecting positions of said rotor, means defining an opening in said rotor, a station selector shaft extending through said opening for selectively moving said rotor to said station selecting positions, an oscillator selectively controllable in frequency by said oscillator tuning elements, said selector shaft having sufficient clearance within said rotor opening to permit the position of said rotor to vary with respect to said stator in each of said station selecting positions of said shaft, the frequency of said oscillator varying with said variation in rotor position, cam means on said rotor and an indexing member on said stator and having a pair of opposed spring arms adapted to engage the opposite edges of said cam means for providing a detent action for said station selector shaft in each of said station selecting positions while accurately resetting said rotor blade with respect to said pairs of stator contact fingers in each of said positions irrespective of any play between said shaft and said oscillator switch rotor.

7. In a television tuner, a tuning compartment, a station selector switch including at least one switch wafer positioned within said compartment, said switch wafer having cooperating rotor and stator switch parts, a station selector shaft extending through one wall of said tuning compartment and connected to said switch rotor for selectively moving said rotor to different station selecting positions, a vernier tuning capacitor positioned within said compartment between said switch wafer and said one wall of said compartment and including a fixed plate and a movable plate, said movable plate being supported on a rotatable member which is positioned coaxially with said station selector shaft within said compartment, a hollow vernier tuning shaft extending through said one wall of said compartment and positioned concentric with said station selector shaft, the end of said vernier tuning shaft which is positioned within said compartment being connected to said movable capacitor plate, and cooperating indexing means on said rotor and stator parts for providing a detent action for said station selector shaft in each of said station selecting positions.

8. In a television tuner, a tuning compartment, a station selector switch including an oscillator switch wafer positioned within said compartment and having a rotor and a stator, said stator having a plurality of spaced stationary contacts thereon and inductive oscillator tuning elements connected to said stationary contacts, said rotor having at least one movable contact thereon adapted successively to engage said stator contacts in successive station selecting positions of said rotor, a station selector shaft extending through one wall of said compartment and connected to said rotor for selectively moving said rotor to said station selecting positions, a vernier tuning capacitor positioned within said compartment and including a fixed plate and a movable plate, a hollow vernier tuning shaft extending through said one wall of said compartment and positioned concentric with said station selector shaft, the end of said vernier tuning shaft which is positioned within said compartment being connected to said movable capacitor plate, and cooperating indexing means on said rotor and said stator for providing a detent action for said station selector shaft in each of said station selecting positions while providing accurate resettability of said rotor in each of said station selecting positions.

9. In a television tuner, a station selector switch having a station selector shaft operable to different station selecting positions, a vernier tuning capacitor having a movable element, a vernier tuning shaft positioned coaxially with said station selector shaft and connected to said movable element, and snap acting detent means for permitting said vernier tuning shaft to be positioned only in one of a plurality of predetermined vernier tuning positions of said movable element and for positively holding said vernier tuning shaft in one of said vernier tuning positions, whereby friction between said coaxial shafts will not cause a change in the setting of said movable element when said station selector shaft is operated to different station selecting positions.

10. In a television tuner, a station selector switch having a station selector shaft operable to different station selecting positions, a vernier tuning capacitor having a fixed element and a movable element, a vernier tuning shaft positioned coaxially with said station selector shaft and connected to said movable element, and cooperating snap acting indexing means on said fixed and movable vernier tuning elements for positively holding said vernier tuning shaft in each of a plurality of vernier tuning positions of said movable element, whereby friction between said coaxial shafts will not cause a change in the setting of said movable element when said station selector shaft is operated to different station selecting positions.

11. In a rotary selector switch, a self-indexing switch wafer comprising, a stator plate having a central opening therein and having a plurality of stationary contacts positioned thereon and extending into said opening, a rotor rotatably mounted in said central opening and having a conductive rotor contact thereon adapted successively to engage said stationary contacts as said rotor is rotated, cam means on said rotor having spaced teeth in the periphery thereof, and an indexing member pivotally mounted on said stator plate and having a pair of resilient arm portions adapted to engage opposite edges of said cam means, one of said resilient arms being adapted to ride along the periphery of the teeth of said cam means and the other of said resilient arms being adapted to seat in one of the peripheral notches between said teeth on said cam means to provide balanced forces acting on said rotor to restrain the same in each contact-engaging position.

12. In a rotary selector switch, a self-indexing switch wafer comprising, a stator plate having a central opening therein and having a plurality of stationary contacts positioned thereon and extending into said opening, a rotor rotatably mounted in said central opening and having a conductive rotor contact thereon adapted successively to engage said stationary contacts as said rotor is rotated, cam means on said rotor having spaced teeth in the periphery thereof, and an indexing member pivotally mounted on said stator plate and having a pair of resilient arm portions adapted to engage opposite edges of said cam means, one of said resilient arms being adapted to ride along the periphery of said teeth of said cam means and the other of said resilient arms being adapted to seat in one of the peripheral notches between said teeth of said cam means to provide balanced forces acting on said rotor to restrain the same in each contact-engaging position, said resilient arm portions being of unequal length to equalize the detent force exerted on said rotor in either direction of rotation thereof.

References Cited in the file of this patent

UNITED STATES PATENTS

| | | |
|---|---|---|
| 735,077 | Everest | Aug. 4, 1903 |
| 1,100,949 | Briggs | June 23, 1914 |
| 1,118,024 | Lawrence | Nov. 24, 1914 |
| 1,156,121 | Wise | Oct. 12, 1915 |
| 1,809,932 | Gebhard | June 16, 1931 |
| 1,863,050 | Hotopp | June 14, 1932 |
| 1,913,992 | Mabie | June 13, 1933 |
| 1,945,525 | Gebhard | Feb. 6, 1934 |
| 2,505,548 | Hutt | Apr. 25, 1950 |
| 2,506,653 | Soreng et al. | May 9, 1950 |
| 2,535,686 | Lawrence | Dec. 26, 1950 |
| 2,561,930 | Klay | July 24, 1951 |
| 2,584,120 | Fyler et al. | Feb. 5, 1952 |
| 2,620,378 | Thias | Dec. 2, 1952 |
| 2,643,361 | Mackey | June 23, 1953 |
| 2,665,343 | Benson | Jan. 5, 1954 |
| 2,700,730 | Prew | Jan. 25, 1955 |
| 2,718,623 | Yoder et al. | Sept. 20, 1955 |